UNITED STATES PATENT OFFICE.

JOHN JOHNSON, OF BROOKLYN, NEW YORK, ASSIGNOR TO THE EMPIRE LUBRICATING COMPANY, OF NEW YORK CITY.

IMPROVEMENT IN LUBRICATING COMPOSITIONS FOR JOURNAL-BEARINGS.

Specification forming part of Letters Patent No. 193,710, dated July 31, 1877; Reissue No. 8,140, dated March 26, 1878; application filed February 27, 1878.

*To all whom it may concern:*

Be it known that I, JOHN JOHNSON, of Brooklyn, in the county of Kings and State of New York, have invented certain new and useful Improvements in Lubricating Compounds; and I do hereby declare that the following is a full, clear, and exact description thereof, which will enable others skilled in the art to which it appertains to make and use the same.

This invention relates to lubricating compounds; and it consists in combining certain quantities of plumbago, soluble glass, asbestus, and whiting, whereby the whole may be molded into a hard compact form, ready for use.

In making my compound, I use the following ingredients, in about the proportions named: Six parts of plumbago, six parts of soluble glass, two parts of asbestus, and one part of whiting.

In combining these ingredients, I take the soluble glass and whiting and mix well together, and then perform the same operation with the asbestus and plumbago. Then I take the two parts and mix together, after which the whole may be run into a mold of any desired shape, and allowed to become hard, and in this condition I design it to be used.

By thus producing a lubricator which dispenses with the use of oil, I not only overcome the difficulty of using an oil-can, but also dispense with all waste, and admit of the entire amount of the lubricant being used.

The presence of whiting in the compound has for its object the hardening of the soluble glass. The compound can be made without it, but not so well, for the glass would not become so hard as is necessary to its perfect working. Both the soluble glass and whiting, therefore, are used as a binding medium of plumbago and asbestus.

Having thus fully described the invention, I would state my claims as follows:

1. A new composition of matter, consisting of plumbago and asbestus, together with an indurating binding medium, substantially as herein shown and described.

2. As a new article of manufacture, the lubricating journal-bearings, consisting of asbestus, forming the body of the same, and being a non-conductor of heat, plumbago as the lubricant or anti-friction ingredient, and an indurating binding medium, the whole being compounded and molded substantially as herein described and set forth.

3. A lubricating compound consisting of plumbago, soluble glass, asbestus, and whiting, in about the proportions named, the whole adapted to be molded into any desired form, for the purposes set forth.

In testimony whereof I have hereunto signed my name this 25th day of February, A. D. 1878.

JOHN JOHNSON.

Witnesses:
L. BRISBANE,
ALEX. CAMERON.